Figure 2:
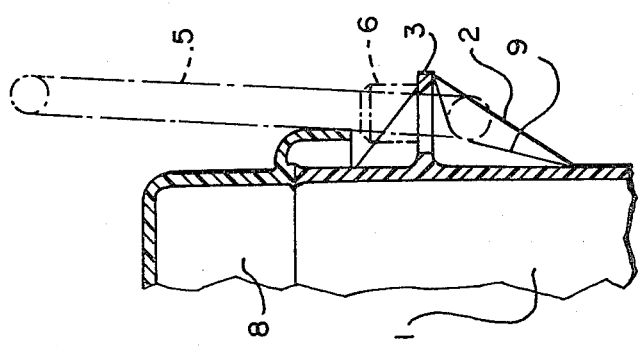

United States Patent [19]
Gummelt

[11] 3,797,876
[45] Mar. 19, 1974

[54] BATTERY CARRYING ARRANGEMENT

[75] Inventor: Klaus Gummelt, Garbsen, Germany

[73] Assignee: Varta Aktiengesellschaft, Frankfurt/Main, Germany

[22] Filed: Sept. 12, 1972

[21] Appl. No.: 288,453

[30] Foreign Application Priority Data
Sept. 17, 1971 Germany .................... 7135447

[52] U.S. Cl. ........ 294/63 B, 16/114 R, 16/DIG. 15, 224/45 F
[51] Int. Cl. ............................................. H01m 1/04
[58] Field of Search ........ 294/62 R, 63 B, 63 R, 92, 294/27 H; 180/68.5; 136/166, 171, 181; 16/110.5, 114 R, 114 B, 119, 125, DIG. 15; 224/45 R, 45 F, 45 N, 45 P, 45 T, 55, 56, 57, 58; 220/94 R; 206/2; 24/115 R, 115 A, 115 J, 115 K, 123 A, 201 HE, 224 HE, 224 R, 222 R, 225, 230.5 R

[56] References Cited
UNITED STATES PATENTS
1,485,438   3/1924   Spoeneman...................... 16/125 X FOREIGN PATENTS OR APPLICATIONS
1,487,164   6/1967   France ................................ 136/181
869,329   5/1961   Great Britain ................... 136/166.7
1,100,552   9/1955   France ............................. 24/123 A Primary Examiner—Evon C. Blunk
Assistant Examiner—James L. Rowland
Attorney, Agent, or Firm—Weiser & Stapler

[57] ABSTRACT

A plastic carrying handle for batteries has enlarged ends attached to a rib-supported ledge protruding from the side of the battery case. The part of the handle near each end loops below the ledge and passes upwardly through a slot in the ledge so that its respective enlarged end is supported on the top of the ledge.

10 Claims, 3 Drawing Figures

BATTERY CARRYING ARRANGEMENT

SPECIFICATION

The invention relates to an improved carrying arrangement for starter batteries, and more particularly, to an improved carrying handle and handle attachment arrangement for such batteries.

There are many known forms of carrying handles for starter batteries. For batteries using hard rubber cases, the best known forms are made of steel, and have retainer plates which are clamped or screwed to the battery case. These suffer from the fact that they are expensive to make, and are attacked by the battery acid, which corrodes them and also makes them unsightly. Moreover the loose handle loop in this type of construction makes unwanted noise when subjected to vibration. Also, in attaching such a handle, the hard rubber case is sometimes damaged.

More recently, plastic handles have also been used to some extent for hard rubber batteries. In known forms, such plastic handles are sometimes made of molded material, whose carrying strength is insufficient.

Handles which have demonstrated adequate carrying strength, corrosion resistance and freedom from noise are those made of plastic rope, formed by extrusion molding and attached by being passed through holes in the battery casing. However, this type of arrangement is expensive.

The increasing use of plastics, particularly polypropylene, for various elements of starter batteries, has given rise to new problems and new opportunities concerning the formation of the carrying handle.

For manufacturing reasons, it is necessary to make these battery cases in thin-walled form, particularly avoiding accumulations of extra material in forming the handle attachments. In addition, transmission of the forces acting upon the handle to the wall of the battery case should not take place at a point, but should be distributed over as large an area as possible, on account of the high elasticity of the case.

Accordingly, it is an object of the present invention to alleviate the above-mentioned shortcomings of the prior art.

It is another object to provide an improved battery carrying handle and attachment for thin-walled plastic battery cases.

It is still another object to provide an improved battery carrying handle and attachment in which the transmission of forces from handle to case is distributed over a substantial area.

These, and other objects which will appear, are achieved, in accordance with the invention, by forming in the sidewall of a battery case made of thin-walled plastic (preferably polypropylene), a horizontal carrying ledge supported by vertical ribs. The ledge is provided with two pairs of apertures, one pair being completely encircled by the material forming the ledge, while the other pair has a slot opening through the outer edge of the ledge. The ends of the handle are passed downwardly through the encircled apertures and are then looped back upwardly and inserted into the open slots, so that the enlarged ends of the handle ultimately terminate above the carrying ledge.

Figure 1:
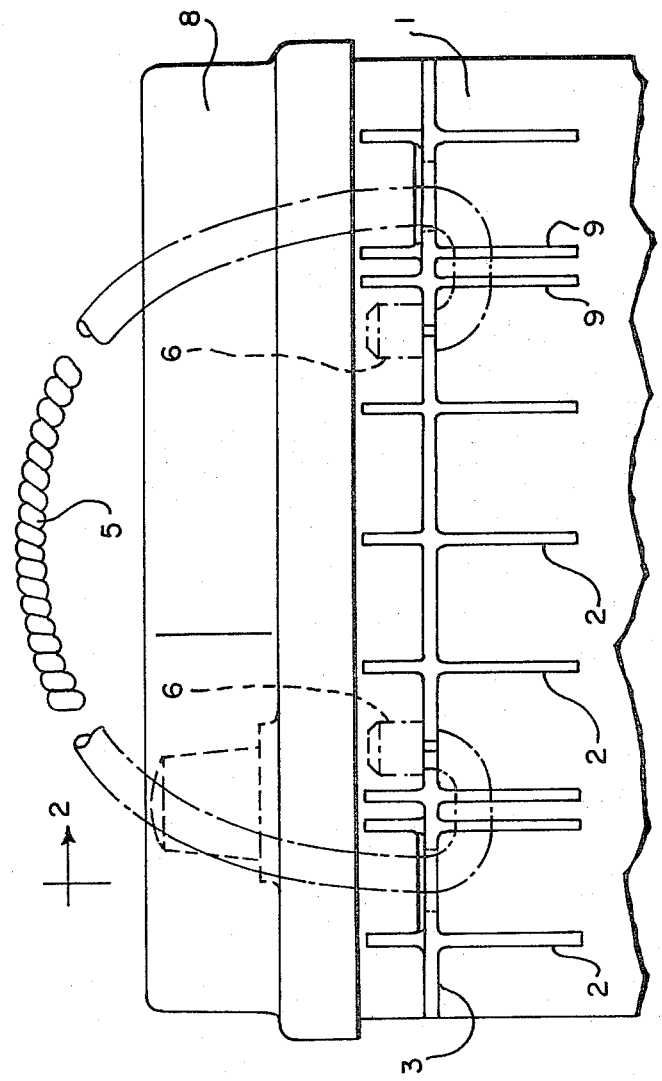
Figure 3:
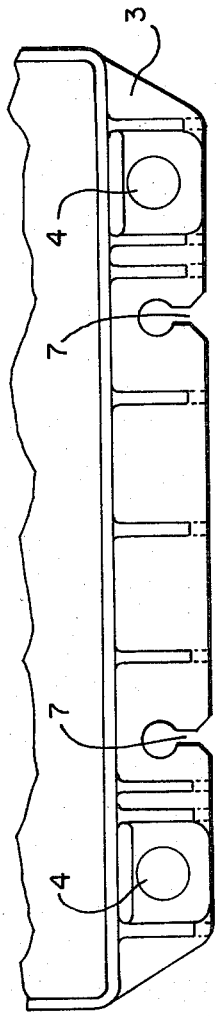

For further details, reference is made to the description which follows, in the light of the accompanying drawings wherein FIG. 1 is an elevation view of a battery case and carrying handle embodying the invention, FIG. 2 is a cross-section taken through the apparatus of FIG. 1 along section lines 2—2 and FIG. 3 is a top view of the battery case shown in FIG. 1.

The same reference numerals are used in the different figures to designate similar elements.

As shown in the drawings, to which reference may now be had, an arrangement embodying the invention comprises a molded battery case 1 from which protrudes a ledge 3 molded integrally with the battery case. This ledge is provided with a plurality of spaced-apart supporting ribs 2 and 9, the ribs 9 being formed in closely spaced pairs, for reasons discussed in more detail below.

The ledge 3 is provided, preferably near its extreme ends, with two apertures 4 which are completely encircled by the ledge material. These will be referred to as the "closed" apertures. Somewhat nearer the center, there are provided two other apertures 7, which have slots leading to the outer edge of the ledge. These apertures will be referred to as the "slotted" apertures.

A conventional cover 8 may be placed on the top of battery case 1. A plastic handle 5 loops upwardly from the battery for carrying purposes. To avoid obscuring the battery construction, itself, this handle 5 has been shown in phantom where it overlaps the battery case. This handle is preferably made of plastic rope. At each end, handle 5 has an enlarged end portion 6. The closed apertures 4 in ledge 3 are so proportioned as to permit passage of these enlarged end portions 6 and, of course, also of the thinner intermediate portions of the handle 5. On the other hand, slotted apertures 7 are too small to permit passage of these enlarged end portions 6, but are sufficiently large to permit passage of the intermediate portion.

The handle 5 is attached to the carrying ledge 3 by passing the enlarged end portions 6 of the handle through the respective closed apertures 4, then looping the handle ends back upwardly and inserting them into the slotted apertures 7, so that the enalrged end portions 6 end up above the upper surface of ledge 3, as shown in FIGS. 1 and 2. When the battery is picked up by handle 5, these enlarged ends 6 come to rest on top of ledge 3 and are restrained from moving downwardly further by the insufficient size of slotted apertures 7.

In order to trap the carrying handle 5 more securely within slotted apertures 7, these may be formed in a keyhole shape, as shown most clearly in FIG. 3 of the drawings, the parallel-sided portion of the keyhole being narrower than even the diameter of the thinner intermediate portion of carrying handle 5 but being, by virtue of the thin plastic construction of the ledge 3, sufficiently elastic to be deformable so as to permit insertion of the carrying handle. Once the handle is inside the enlarged, circular region of the keyhole slot, the narrow exit portion restrains it from moving back out of the slotted aperture. The handle attached in the above-described manner may be depressed below the level of the cable connections to the battery terminals. The handle need not be shaped as a rope but can have any construction suited best for the purpose intended. It can be smooth, as a strap and the like. Any plastic (thermosetting or thermoplastic) elastomeric or not, can be used.

The forces exerted during carrying of the battery by this handle are distributed over a large area by means of the ledge 3 and the supporting ribs. As shown in FIG. 2, ribs 2 preferably extend in a straight line from their roots at case 1 to the outer edge of ledge 3. The distribution of forces is further promoted by the paired ribs 9 which, as also shown in FIG. 2, are preferably bowed inwardly toward the wall of the battery case 1. This shape is used because these paired ribs 9 are positioned within the loops formed by the handle after it passes downwardly through enclosed apertures 4 and back up through slotted apertures 7. The bowing of the paired ribs 9 permits these loops to pass the ribs without lateral deflection, and supporting the undersides of these paired ribs.

It will be understood that various modifications will occur to those skilled in the art, without departing from the inventive concept. Accordingly it is desired that this concept be limited only by the appended claims.

I claim:

1. A carrying arrangement for an electric battery having an outer case, comprising
    a ledge protruding from said case, said ledge having at least two slotted apertures, and
    said ledge also having two closed apertures, respectively positioned adjacent different ones of said slotted apertures.

2. The arrangement of claim 1, further comprising
    an elongated handle having enlarged end portions, said end portions being smaller than said closed apertures, but larger than said slotted apertures, said handle extending downwardly through said closed apertures, being looped below said ledge, and extending upwardly through said slotted apertures, said enlarged end portions being positioned above said ledge at said slotted apertures.

3. The arrangement of claim 2, wherein said handle is made of plastic rope.

4. The arrangement of claim 3, wherein said plastic is polypropylene.

5. The arrangement of claim 1, further comprising
    ribs positioned transversely to said ledge, and leading from said case toward the outer edge of said ledge, any of said ribs positioned between adjacent closed and slotted apertures having outer edges bowed inwardly toward the case.

6. The arrangement of claim 5, wherein ribs not positioned between adjacent closed and slotted apertures have substantially straight outer edges.

7. The arrangement of claim 1, wherein said case is made of thin-walled plastic.

8. The arrangement of claim 7, wherein said slotted apertures have a keyhole shape with a generally circular region and a region formed of generally parallel sides leading from the circular region to the outer edge of said ledge.

9. The arrangement of claim 8, wherein the space between said generally parallel sides is less than the diameter of said circular region.

10. The arrangement of claim 9, wherein said ledge is deformable at least in the area of said generally parallel sides, so as to permit passage into and out of said circular region of an object wider than said space between said parallel sides.

* * * * *